United States Patent [19]

Clegg

[11] Patent Number: 4,598,696
[45] Date of Patent: Jul. 8, 1986

[54] BLACK-WATER SOLAR PANEL

[76] Inventor: John E. Clegg, 2320 Keystone Dr., Orlando, Fla. 32806

[21] Appl. No.: 726,579

[22] Filed: Apr. 24, 1985

[51] Int. Cl.$^4$ ................................................. F24J 2/10
[52] U.S. Cl. ..................................... 126/448; 126/442; 126/450
[58] Field of Search ............... 126/450, 448, 442, 449; 138/38, 44; 165/146, 147

[56] References Cited

U.S. PATENT DOCUMENTS

| | | | |
|---|---|---|---|
| 3,212,521 | 10/1965 | Jean | 138/44 X |
| 3,348,923 | 10/1967 | Demarest | 165/146 X |
| 4,011,858 | 3/1977 | Hurkett | 126/438 X |
| 4,124,062 | 11/1978 | Anderson et al. | 138/38 X |
| 4,143,643 | 3/1979 | Gerin et al. | 126/438 |
| 4,221,210 | 9/1980 | Cuijanovich | 126/900 X |
| 4,505,257 | 3/1985 | Nguyen | 126/432 |
| 4,505,258 | 3/1985 | Yoon | 126/424 |
| 4,505,261 | 3/1985 | Hunter | 126/433 |

*Primary Examiner*—Larry Jones

[57] ABSTRACT

A passive solar heating system in which an opaque black-dye solution of water and alcohol circulates through a flat tapered spreading chamber and through a series of seven parallel conical flow tubes. The spreading chamber and the flow tubes are clear glass, and this permits the direct absorption of radiant heat into the water. A flow tube is an elongated glass tube composed of multiple conical sections. The direction of flow is from the small end of the conical section to the large end. The heated water expands outward against the tapered wall of the conical section and deflects in the direction of flow, thereby increasing the rate of flow.

1 Claim, 3 Drawing Figures

BLACK-WATER SOLAR PANEL

BACKGROUND

Passive solar heating systems featuring a series of heat tubes enclosed in a glass panel are well established in the art. One of the latest patents to be issued is that of Hunter, *Modular Passive Solar Heating Systems,* U.S. Pat. No. 4,505,261, dated 3/19/85. This system is representative of the flat-plate solar collectors which feature a series of heat tubes mounted in an elongate panel similar to that of the subject disclosure.

SUMMARY

The back-water solar panel has four features which, when used in combination, are original and unique, as follows;

1. Black water. An opaque black-dye solution of water and alochol has an advantage over clear water in that it directly absorbs the heat of solar radiation which penetrates clear water. Alcohol or anti-freeze is added to the water to prevent freezing during inoperative stages.

2. Spreading chamber. A thin flat triangular spreading chamber distributes the water over a broad area, and the water is preheated prior to entering the flow tubes. Both the side walls and the upper and lower walls of the spreading chamber are tapered so as to use the thermal expansion forces in much the same way that the flow tubes do.

3. Flow tubes. The thermal expansion of the water against the tapered walls of the conical sections of the flow tubes increases the rate of flow, and the water circulates freely without the need of a pump.

4. Transparent spreading chamber and flow tubes. The use of clear glass for the spreading chamber and flow tubes increases the temperature of the circulating water. The water absorbs heat directly from solar radiation and from conduction through the glass walls of the chamber and flow tubes.

The black-water system is well suited for use with radiant ceiling panels.

DRAWINGS

DESCRIPTION

Figure 1:
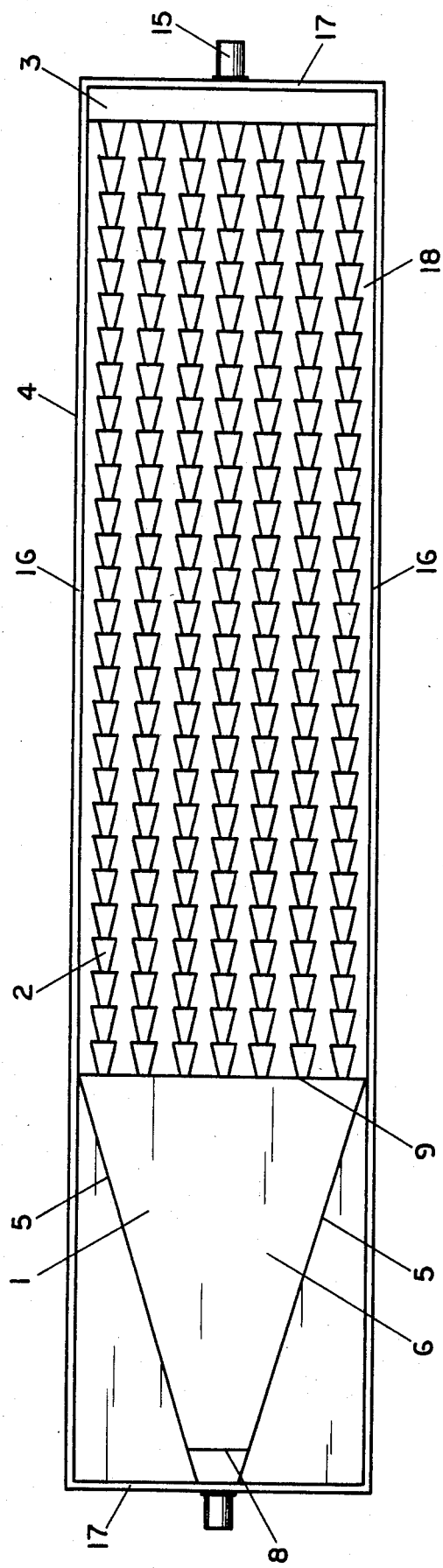
FIG. 1 is a plan view of the black-water solar panel.

FIG. 1 is a plan view of the black-water solar panel showing spreading chamber 1, a series of seven parallel flow tubes 2 and outlet chamber 3 mounted in elongate rectangular panel 4.

Figure 2:
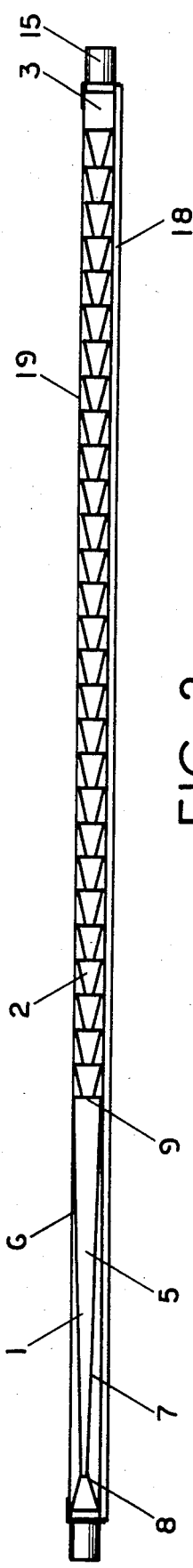
FIG. 2 is a side view of the panel with the nearest side wall removed to reveal the interior parts.
Figure 3:
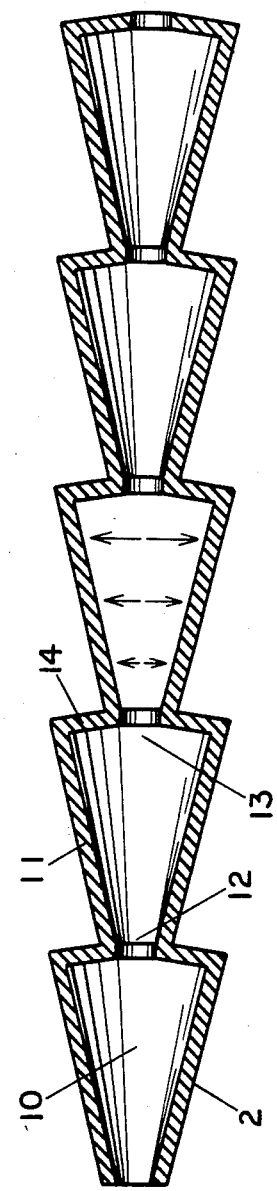
FIG. 3 is an enlarged longitudinal section of a flow tube.

Spreading chamber 1 is triangular in shape with two vertical side walls 5 inclined 18° from the longitudinal axis of the panel and upper wall 6 and lower wall 7 (FIG. 2) inclined 2° from the axis. The ratio of the cross-sectional areas of inlet end 8 to outlet end 9 is 1:24.

Walls 5, 6 and 7 are transparent glass which exposes the circulating black-dye water to the sun rays. The water receives heat by direct absorption of solar radiation and by conduction of heat through the walls of the chamber. The heated water expands outward and is deflected off the walls in the direction of flow, thereby increasing the rate of flow.

The water next passes through a series of seven parallel flow tubes 2. Each tube 2 consists of multiple frusto-conical sections 10 aligned on the longitudinal axis. Section walls 11 are inclined 15° from the axis. The ratio of the cross-sectional areas of the inlet end 12 to outlet end 13 of the sections is 1:4.

Section walls 11 are transparent glass, and the water circulating through the tubes is heated by direct absorption of solar radiation and by conductin through the walls of the tube. The heated water expands outward against the walls of the tube and deflects in the direction of flow, thereby increasing the rate of flow.

The outlet end 13 of frusto-conical section 10 is connected to the inlet end 12 of the adjacent frusto-conical section 10 by end wall 14 which is inclined 82.5° from the longitudinal axis.

The water flows from flow tubes 2 into transverse outlet chamber 3 and exits the panel through outlet tube 15.

Panel 4 consists of two vertical parallel side walls 16, two vertical parallel end walls 17, a base 18, and a plate glass cover 19.

I claim:

1. A black-water solar panel comprising a spreading chamber (1), a series of seven parallel flow tubes (2) and an outlet chamber (3) mounted inside an elongate rectangular panel (4):
   a. said elongate rectangular panel (4) having two vertical parallel side walls (16), two vertical parallel end walls (17), a base (18) and a plate glass cover (19), and a longitudinal axis;
   b. said spreading chamber (1), having a narrow inlet end (8) and a wide outlet end (9) and two vertical side walls (5) inclined 18° from the longitudinal axis of the panel (4), an upper wall (6), and a lower wall (7) inclined 2° from the longitudinal axis, said side walls (5), upper wall (6) and lower wall (7) being transparent glass and extending from the narrow inlet end (8), to the wide outlet end (9) of spreading chamber (1);
   c. said flow tubes (2) comprising multiple frusto-conical sections (10) having a longitudinal axis, the sections having transparent glass section walls (11) inclined 15° from the longitudinal axis and having a small inlet end (12), a large outlet end (13) and an end wall (14) connecting the small inlet end (12) to the large outlet end (13) of the adjacent frusto-conical section (10); and
   d. a heat absorbing liquid medium for use in the collector comprising water to which a black dye has been added to render the water opaque to the transmission of light.

* * * * *